(12) United States Patent
Coomer et al.

(10) Patent No.: US 7,974,078 B2
(45) Date of Patent: Jul. 5, 2011

(54) ELECTRICAL ENCLOSURE ASSEMBLY HAVING VENTING SYSTEM

(75) Inventors: Jarrod L. Coomer, Weaverville, NC (US); Michael H. Abrahamsen, Greenwood, SC (US); David A. Metcalf, Black Mountain, NC (US); Timothy Fair, Boiling Springs, SC (US)

(73) Assignee: Eaton Corporation, Cleveland, OH (US)

( * ) Notice: Subject to any disclaimer, the term of this patent is extended or adjusted under 35 U.S.C. 154(b) by 308 days.

(21) Appl. No.: 12/018,591

(22) Filed: Jan. 23, 2008

(65) Prior Publication Data
US 2009/0185333 A1 Jul. 23, 2009

(51) Int. Cl.
*H02B 1/26* (2006.01)
*H05K 7/20* (2006.01)

(52) U.S. Cl. .................. 361/678; 361/622; 312/236

(58) Field of Classification Search ............ 361/622, 361/678; 312/236
See application file for complete search history.

(56) References Cited

U.S. PATENT DOCUMENTS

| | | | |
|---|---|---|---|
| 2,824,939 A * | 2/1958 | Claybourn et al. | ........... 200/289 |
| 4,002,864 A | 1/1977 | Kuhn et al. | |
| 4,002,865 A | 1/1977 | Kuhn et al. | |
| 4,017,698 A | 4/1977 | Kuhn et al. | |
| 4,528,614 A * | 7/1985 | Shariff et al. | ............... 361/678 |
| 4,728,757 A | 3/1988 | Buxton et al. | |
| 4,821,909 A | 4/1989 | Hibler et al. | |
| 4,876,424 A | 10/1989 | Leone et al. | |
| 5,124,881 A * | 6/1992 | Motoki | ........................ 361/605 |
| 5,193,049 A * | 3/1993 | Jackson | ........................ 361/676 |
| 5,457,296 A | 10/1995 | Neill et al. | |
| 5,493,092 A | 2/1996 | Rowe | |
| 5,574,624 A * | 11/1996 | Rennie et al. | ................. 361/676 |
| 5,689,097 A * | 11/1997 | Aufermann et al. | .......... 218/157 |
| 5,710,402 A * | 1/1998 | Karnbach et al. | ............. 218/157 |
| 5,767,440 A * | 6/1998 | Byron et al. | ............... 174/17 VA |
| 5,878,905 A | 3/1999 | Gronbach et al. | |
| 5,892,195 A * | 4/1999 | Aufermann et al. | .......... 218/157 |
| 5,967,170 A | 10/1999 | Hume et al. | |
| 6,031,192 A | 2/2000 | Liebetruth | |

(Continued)

FOREIGN PATENT DOCUMENTS

DE 3411643 A1 10/1985

(Continued)

OTHER PUBLICATIONS

United States Patent and Trademark Office, Final Office Action, U.S. Appl. No. 12/018,587, Sep. 30, 2009, 14 pp.

(Continued)

*Primary Examiner* — Anatoly Vortman
(74) *Attorney, Agent, or Firm* — Martin J. Moran

(57) ABSTRACT

An electrical enclosure assembly is provided including a first enclosure and a second enclosure disposed within the first enclosure. The first enclosure having a plurality of walls defining an interior and an exterior with one of the walls including a first number of one way vents. The interior being substantially sealed from the exterior except at the first number of one way vents. The second enclosure having a plurality of walls defining an interior separate from the interior of the first enclosure. One of the plurality of walls of the second enclosure including a second number of one way vents. The interior of the second enclosure being substantially sealed from the interior of the first enclosure except at the second number of one way vents.

23 Claims, 7 Drawing Sheets

U.S. PATENT DOCUMENTS

| | | | |
|---|---|---|---|
| 6,070,365 A | 6/2000 | Leonard | |
| 6,215,654 B1 * | 4/2001 | Wilkie et al. | 361/605 |
| 6,367,203 B1 | 4/2002 | Graham et al. | |
| 6,407,331 B1 * | 6/2002 | Smith et al. | 174/50 |
| 6,410,844 B1 * | 6/2002 | Bruner et al. | 174/17 VA |
| 6,417,443 B1 * | 7/2002 | Smith | 174/17 VA |
| 6,563,062 B2 | 5/2003 | Kurano et al. | |
| 6,703,576 B1 | 3/2004 | Chou et al. | |
| 6,827,643 B2 * | 12/2004 | Eiselt et al. | 454/184 |
| 7,019,229 B1 | 3/2006 | Weister et al. | |
| 7,054,143 B2 * | 5/2006 | Eiselt et al. | 361/605 |
| 7,140,702 B2 * | 11/2006 | Byron et al. | 312/296 |
| 7,158,369 B2 | 1/2007 | Lammers | |
| 7,236,352 B2 * | 6/2007 | Dalis | 361/608 |
| 7,391,597 B2 | 6/2008 | Meeks et al. | |
| 7,586,738 B1 * | 9/2009 | Hartzel et al. | 361/676 |
| 7,604,534 B2 * | 10/2009 | Hill | 454/184 |
| 2004/0097186 A1 * | 5/2004 | Eiselt et al. | 454/184 |
| 2006/0152889 A1 * | 7/2006 | Dalis | 361/605 |
| 2007/0097604 A1 * | 5/2007 | Bruski et al. | 361/605 |
| 2009/0141432 A1 * | 6/2009 | Kingston | 361/676 |
| 2009/0185333 A1 | 7/2009 | Coomer et al. | |
| 2009/0200273 A1 * | 8/2009 | Josten et al. | 218/157 |
| 2009/0212022 A1 * | 8/2009 | Josten et al. | 218/157 |

FOREIGN PATENT DOCUMENTS

| | | |
|---|---|---|
| EP | 0288834 A1 | 11/1988 |
| FR | 2749448 A1 | 12/1997 |

OTHER PUBLICATIONS

United States Patent and Trademark Office, Non-Final Office Action, U.S. Appl. No. 12/018,587, Jul. 8, 2009, 13 pp.

* cited by examiner

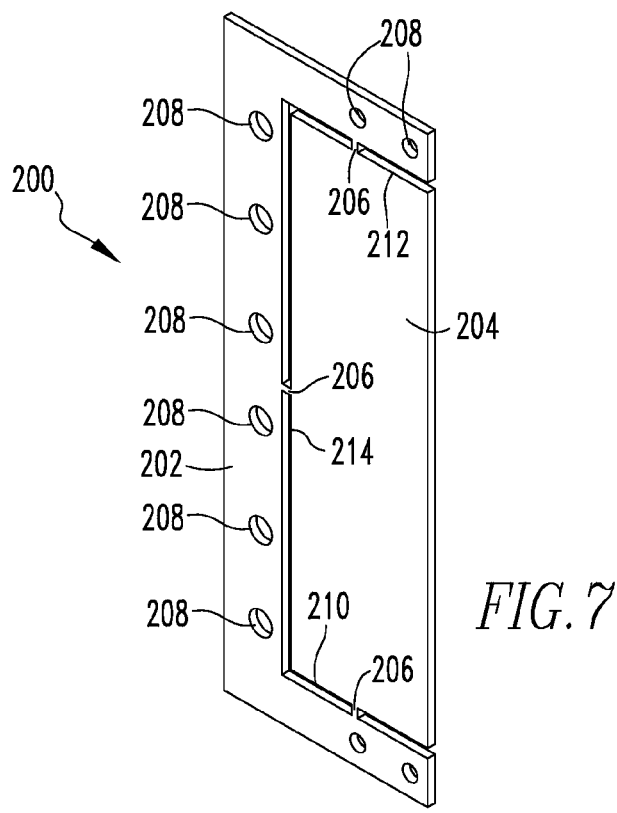
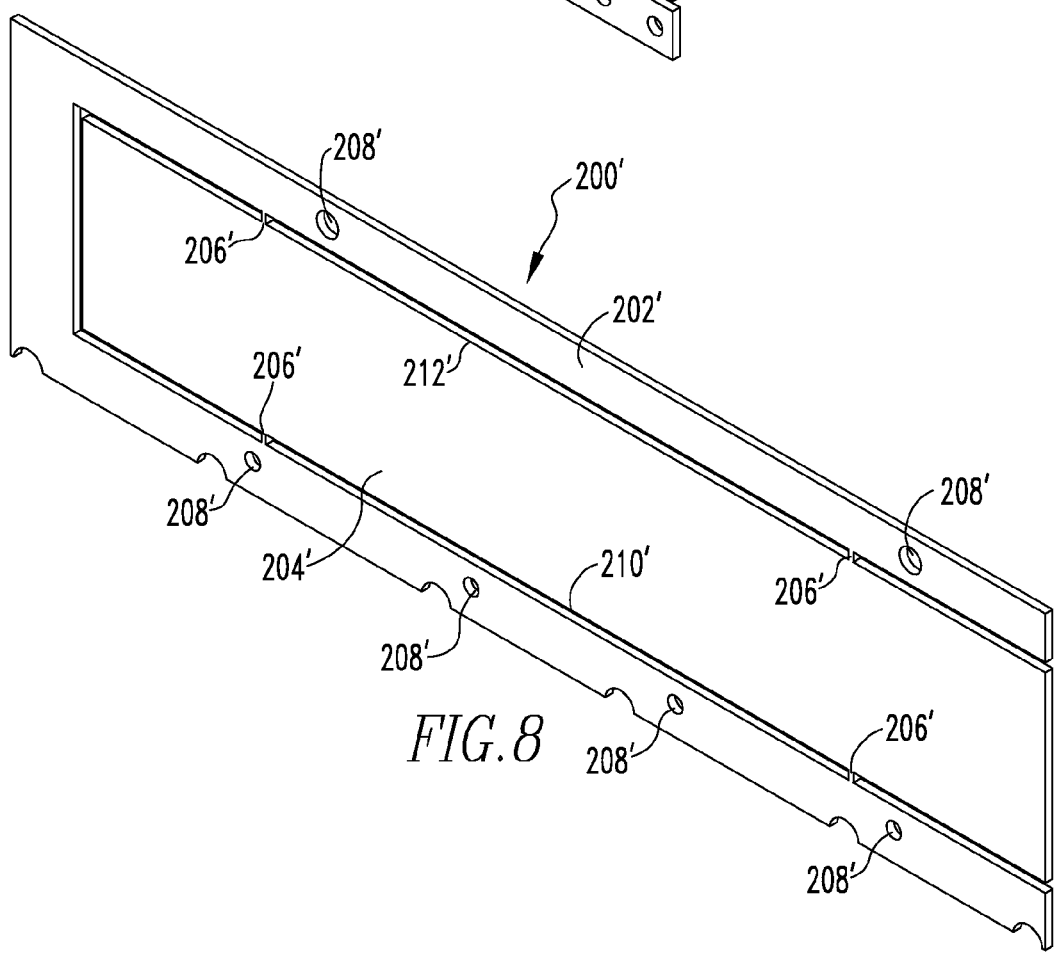

ELECTRICAL ENCLOSURE ASSEMBLY HAVING VENTING SYSTEM

BACKGROUND OF THE INVENTION

1. Field of the Invention

The invention relates generally to electric power distribution systems and, more particularly, to electrical enclosure assemblies for switchgear employed in such electric power distribution systems. The invention also relates to electrical enclosure assemblies for venting of gasses due to electrical arcing.

2. Background Information

Switchgear for electric power distribution systems includes electrical switching apparatus and their line and load terminations together with related equipment mounted in an electrical enclosure (typically a metal cabinet). Switchgear used in sections of electric power distribution systems operating at voltages up through 690 volts is classified as low voltage switchgear (according to international standards, although the ANSI standard for low voltage is a maximum of 600 volts). Typically, the electrical switching apparatus is a circuit breaker, but other switching apparatus such as, for example, network protectors, disconnect switches, and transfer switches are also mounted in such electrical enclosures. Henceforth, the electrical switching apparatus will generally be referred to as circuit breakers, although it will be understood that other types of electrical switching apparatus can be used as well.

Typically, in such low voltage switchgear, multiple circuit breakers are mounted in each cabinet in cells stacked vertically in a forward compartment. The line and load conductors are mounted in rearward compartments and engage the circuit breakers through quick disconnects as the circuit breakers are installed in the cells.

Some electrical switching apparatus can be relatively large. In order to facilitate movement (e.g., installation; removal; maintenance), some circuit breakers are commonly coupled to draw-out mechanisms which permit such circuit breakers to be drawn out of the electrical enclosure. Accordingly, such circuit breakers are commonly known in the art as "draw-out" circuit breakers. Draw-out circuit breakers are described in further detail, for example, in commonly assigned U.S. Pat. No. 7,019,229, which is hereby incorporated herein by reference. See also U.S. Pat. Nos. 4,002,864; 4,002,865; 4,017,698; 4,728,757; 6,031,192; and 6,563,062.

The electrical enclosure for draw-out circuit breakers generally includes an outer structure having a top, a bottom, rear and side walls, and a front access door or easily removable panel.

Circuit breakers are designed to trip in response to a trip condition (e.g., without limitation, an overcurrent condition; an overload condition; a relatively high level short circuit or fault condition). A high current fault interruption, for example, typically results in a substantial arc in the arc chamber of the circuit breaker. The arc forms rapidly expanding gases and may also generate flames. The gases can be extremely hot, are at least partly ionized, and may carry debris, such as molten metal particles and fragments of various circuit breaker components. Furthermore, the gases and debris can be electrically conductive and, therefore, can cause additional undesirable arcing between the circuit breaker and grounded electrically conductive features proximate the circuit breaker, including but not limited to, the metallic enclosure in which such circuit breakers are typically installed. The gases may also be expelled with explosive force and may, therefore, damage components of the enclosure. Expelled gases may also pose a risk to an operator performing normal operating duties in close proximity to such equipment operating under normal circumstances.

Similar arcing can occur between adjacent conductors of different potentials, between an outboard line or load conductor and the switchgear cabinetry, and between the quick disconnects that are electrically connected with the line and load conductors. Such arcing events are generally of greater magnitude and duration than those produced from fault interruption due to tripping of a circuit breaker. Such potential arcing events could result from a number of different scenarios such as, but not limited to: an operator leaving a tool in the switchgear prior to energizing the switchgear, an operator leaving a tool (or other object) on the back of a circuit breaker while racking the breaker onto a live bus, buildup of debris within the switchgear, animals entering the switchgear through venting holes and crossing a live bus, or some other type of unforeseen failure within the switchgear. Severe injury/damage can occur to an operator or other person(s) and equipment nearby if the electrical enclosure is not designed to manage and vent in a controlled manner the large volumes of gas and debris formed from such an arcing event. While known enclosure designs provide vents through which arc gases may pass, such vents are typically designed primarily for cooling of the interior of the enclosure and as such do not provide much, if any, control over potential arc gas venting, particularly not of large scale arc gas formations. Additionally, such vents do not provide for control over debris produced by arcing events which can contaminate other parts within the enclosure which may lead to other arcing events among other detrimental effects.

There is, therefore, room for improvement in electrical enclosures and systems used therein to manage large scale arcing events and particularly the large volumes of gas formed as a result of such arcing events.

SUMMARY OF THE INVENTION

These needs and others are met by embodiments of the invention, which are directed to an electrical enclosure assembly providing controlled venting of arc gases.

In accordance with one aspect of the invention, an electrical enclosure assembly comprises a first enclosure and a second enclosure within the first enclosure. The first enclosure includes a plurality of walls defining an interior and an exterior with one of the walls having a first number of one way vents. The interior being substantially sealed from the exterior except at the first number of one way vents. The second enclosure includes a plurality of walls defining an interior separate from the interior of the first enclosure. One of the plurality of walls of the second enclosure includes a second number of one way vents. The interior of the second enclosure is substantially sealed from the interior of the first enclosure except at the second number of one way vents.

The second interior may include a number of electrical conductors and a pressurized gas formed from an arcing event associated with the number of electrical conductors. The second number of one way vents of the second enclosure may be structured to vent the pressurized gas from the interior of the second enclosure into the interior of the first enclosure and the first number of one way vents of the first enclosure may be structured to further vent the pressurized gas from the interior of the first enclosure to the exterior of the first enclosure.

The first interior may include a number of electrical conductors and a pressurized gas formed from an arcing event associated with the number of electrical conductors. The second number of one way vents of the second enclosure may be structured to seal the interior of the second enclosure from the pressurized gas within the first interior.

The second number of one way vents of the second enclosure may be further structured to direct the pressurized gas toward the first number of one way vents of the first enclosure.

The first enclosure may include a front access portion and the first number of one way vents of the first enclosure may be further structured to direct the pressurized gas away from the front access portion.

Each of the first number of one way vents and the second number of one way vents may comprise a mounting portion coupled to a corresponding wall of the walls of the first enclosure or the walls of the second enclosure and a panel portion extending from the mounting portion. The panel portion may be movable in a first direction from a first position to a different second position relative to the mounting portion and the panel portion may be structured to be restricted from movement in a second direction opposite the first direction by a portion of the corresponding wall. The panel portion may be further structured to vent the pressurized gas by moving from the first position to the different second position.

The panel portion of each of the first number of one way vents and the second number of one way vents may include a number of tabs coupling the panel portion to the mounting portion. The mounting portion and panel portion may be formed from a single piece of material with the panel portion and mounting portion being different portions of the single piece of material. Movement of the panel portion of one of the first number of one way vents from the first position to the different second position may result from flexure of the number of tabs. The single piece of material of the first number of one way vents may be made of a metal.

The number of tabs of one of the second number of one way vents may be disposed along two edges of the panel portion and movement of the panel portion from the first position to the different second position may result from fracture of the number of tabs. One of the second number of one way vents may be made of an insulative material. The insulative material may be a thermoset fiberglass-reinforced polyester.

As another aspect of the invention, an electrical enclosure assembly comprises a first enclosure having a plurality of walls defining an interior and an exterior with one of the walls including a first number of one way vents. Each of the first number of one way vents comprises a first mounting portion and a first panel portion. The first mounting portion being coupled to the one of the walls of the first enclosure and the first panel portion extending from the first mounting portion. The first panel portion being movable in a first direction from a first position to a different second position relative to the first mounting portion. The first panel portion being structured to be restricted from movement in a second direction opposite the first direction by a portion of the one of the walls of the first enclosure. The interior being substantially sealed from the exterior except at the first number of one way vents. The electrical enclosure assembly further comprises a second enclosure within the first enclosure. The second enclosure having a plurality of walls defining an interior separate from the interior of the first enclosure. One of the walls of the second enclosure including a second number of one way vents. Each of the second number of one way vents comprises a second mounting portion and a second panel portion. The second mounting portion being coupled to the one of the walls of the second enclosure and the second panel portion extending from the second mounting portion. The second panel portion being movable in a third direction from a third position to a different fourth position relative to the second mounting portion. The second panel portion being structured to be restricted from movement in a fourth direction opposite the third direction by a portion of the one of the walls of the second enclosure. The interior of the second enclosure being substantially sealed from the interior of the first enclosure except at the second number of one way vents.

BRIEF DESCRIPTION OF THE DRAWINGS

A full understanding of the invention can be gained from the following description of the preferred embodiments when read in conjunction with the accompanying drawings in which:

FIGS. 5-8 are isometric views of panel assemblies for cassette assemblies in accordance with other embodiments of the invention.

DESCRIPTION OF THE PREFERRED EMBODIMENTS

Figure 1:
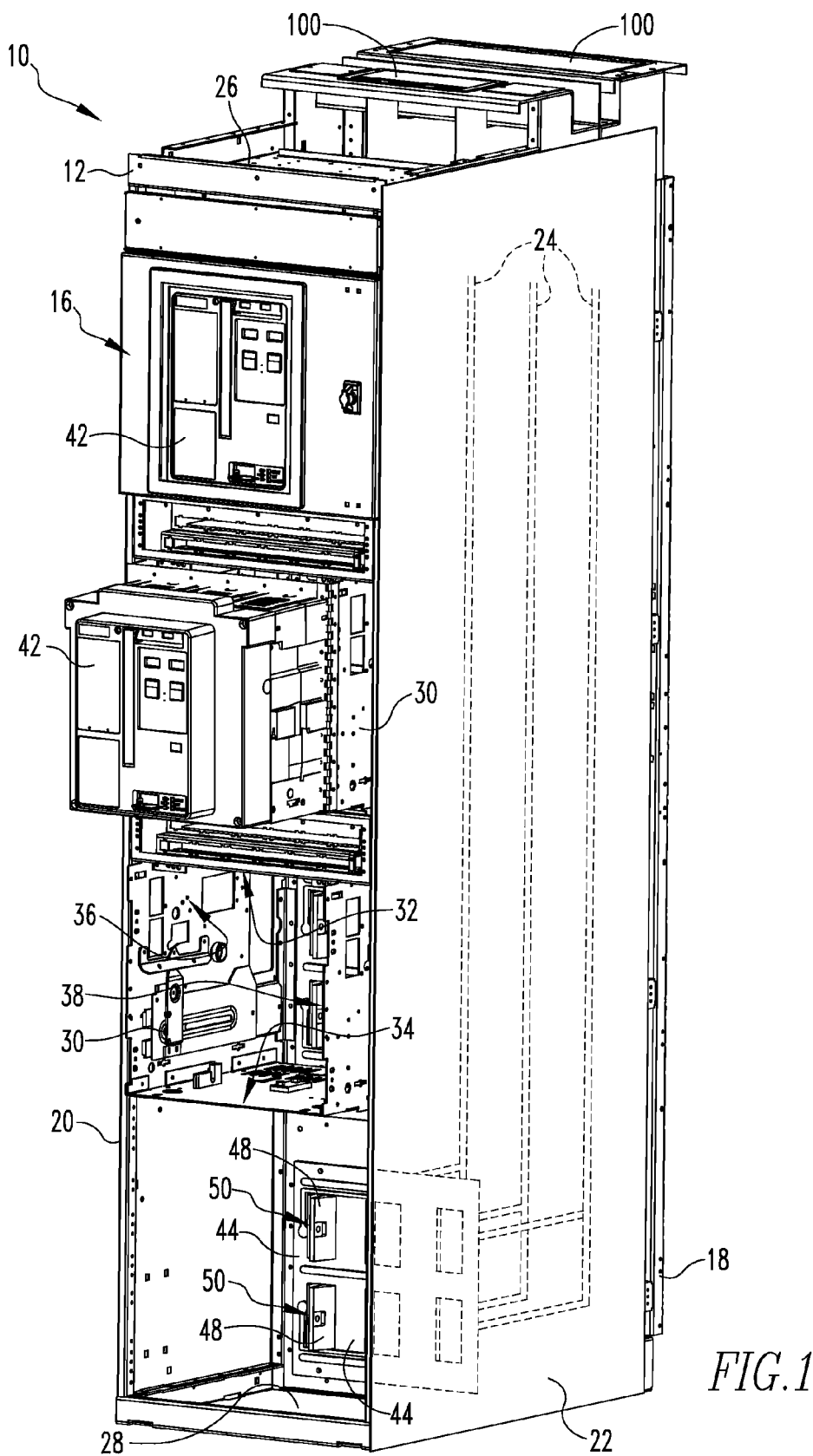
FIG. 1 is a partially exploded isometric view of an electrical cabinet assembly in accordance with embodiments of the invention.

As employed herein, the term "number" shall mean one or an integer greater than one (i.e., a plurality).

Directional phrases used herein, such as, for example, left, right, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "circuit breaker" refers to an electrical circuit breaker that may be drawn into and out of an enclosure (e.g., without limitation, switchgear cabinet), in which it is housed. Such a circuit breaker is also referred to as a "draw-out circuit breaker." A draw-out mechanism (e.g., without limitation, rollers; rails having linear bearings) facilitates the movement of the draw-out circuit breaker into and out of the enclosure.

Figure 2:
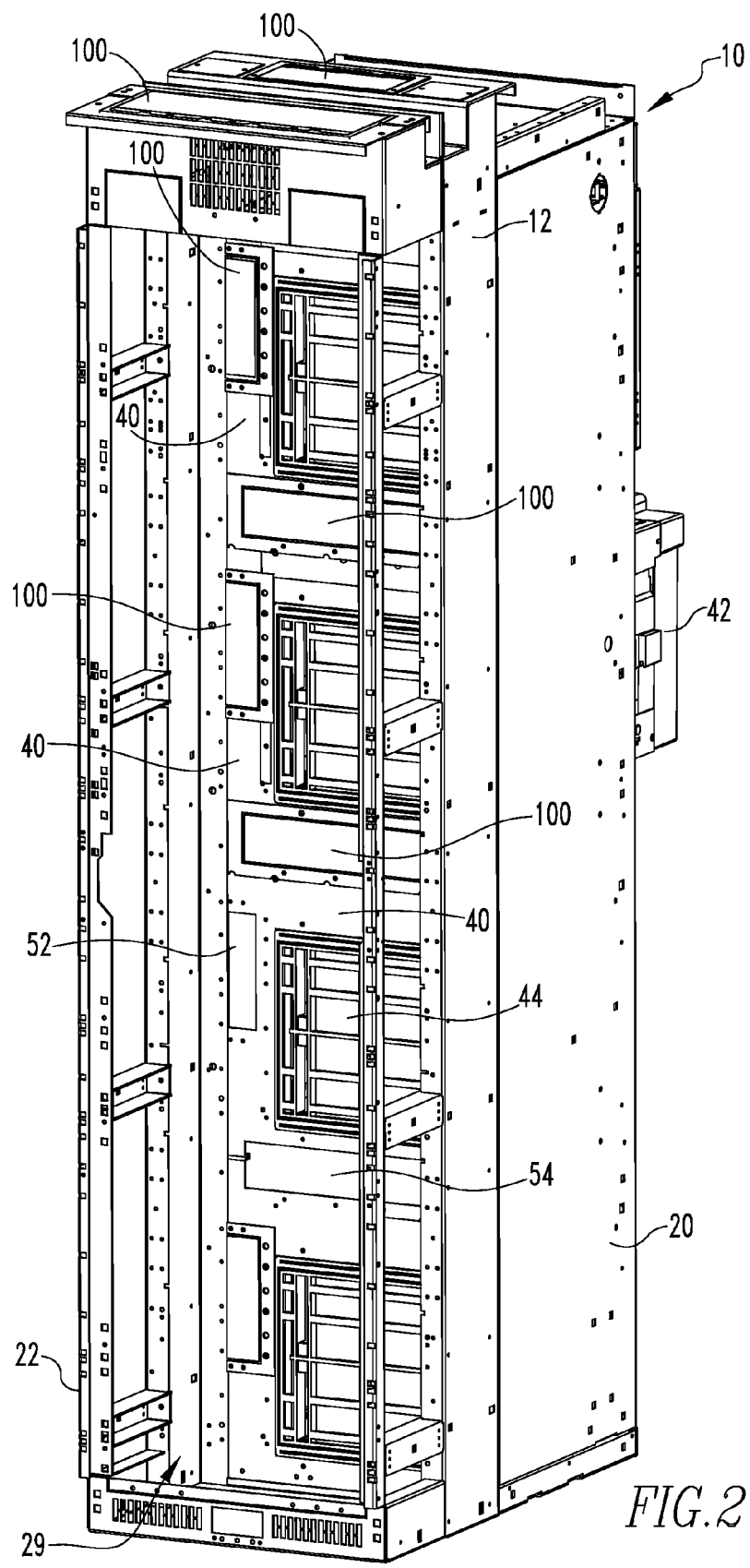
FIG. 2 is an isometric view of the electrical cabinet assembly of FIG. 1 with a rear portion removed to show internal structures.
Figure 9:
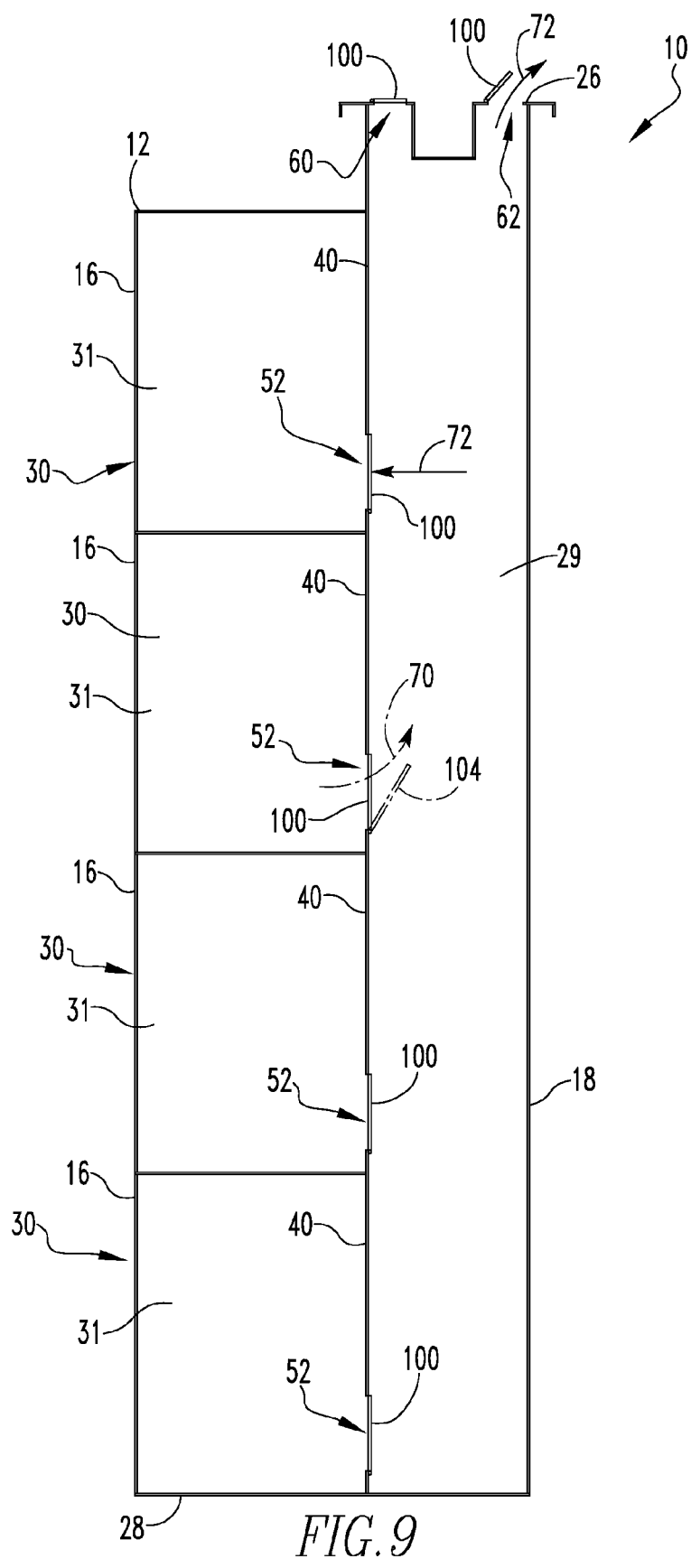
FIG. 9 is a simplified side cross-sectional view of an electrical cabinet assembly in accordance with another embodiment of the invention.

FIGS. 1 and 2 show an electrical cabinet assembly 10 utilizing an example system for venting of gasses due to electrical arcing in accordance with the invention. A complete electrical cabinet assembly may contain one or more of the following combination of parts described herein. The example electrical cabinet assembly 10 includes an electrical enclosure 12 (e.g., without limitation, a switchgear cabinet) having an interior and an exterior defined by a front opening (not numbered) generally covered by a number of removable access panel(s) (not shown) or door(s) 16 (FIG. 1), a rear panel 18, a left side panel 20, a right side panel 22, one or more top panels 26 and a bottom panel 28. The interior of the electrical enclosure 12 is generally divided into a bus compartment 29 (FIGS. 2 and 9) and a number of cassettes 30 (FIGS. 1 and 9). A number of conductors 24 (shown in simplified form in hidden line drawing in FIG. 1) are housed within the bus compartment 29 (FIGS. 2 and 9) of the electrical enclosure 12. It is to be appreciated that in the examples shown, a cable section (not numbered) is included within the bus compartment 29. In other foreseeable examples however, the cable section may be segregated from the bus compartment 29 in a similar manner as described herein for one of the cassettes 30.

Each cassette 30 has an interior 31 (FIG. 9) substantially sealed from the bus compartment 29 as well as preferably substantially sealed from each of the other cassettes 30. FIG. 9 shows a simplified side cut view of the cabinet assembly 10 and the relationship of cassettes 30 and bus compartment 29 within the electrical enclosure 12.

Figure 3:
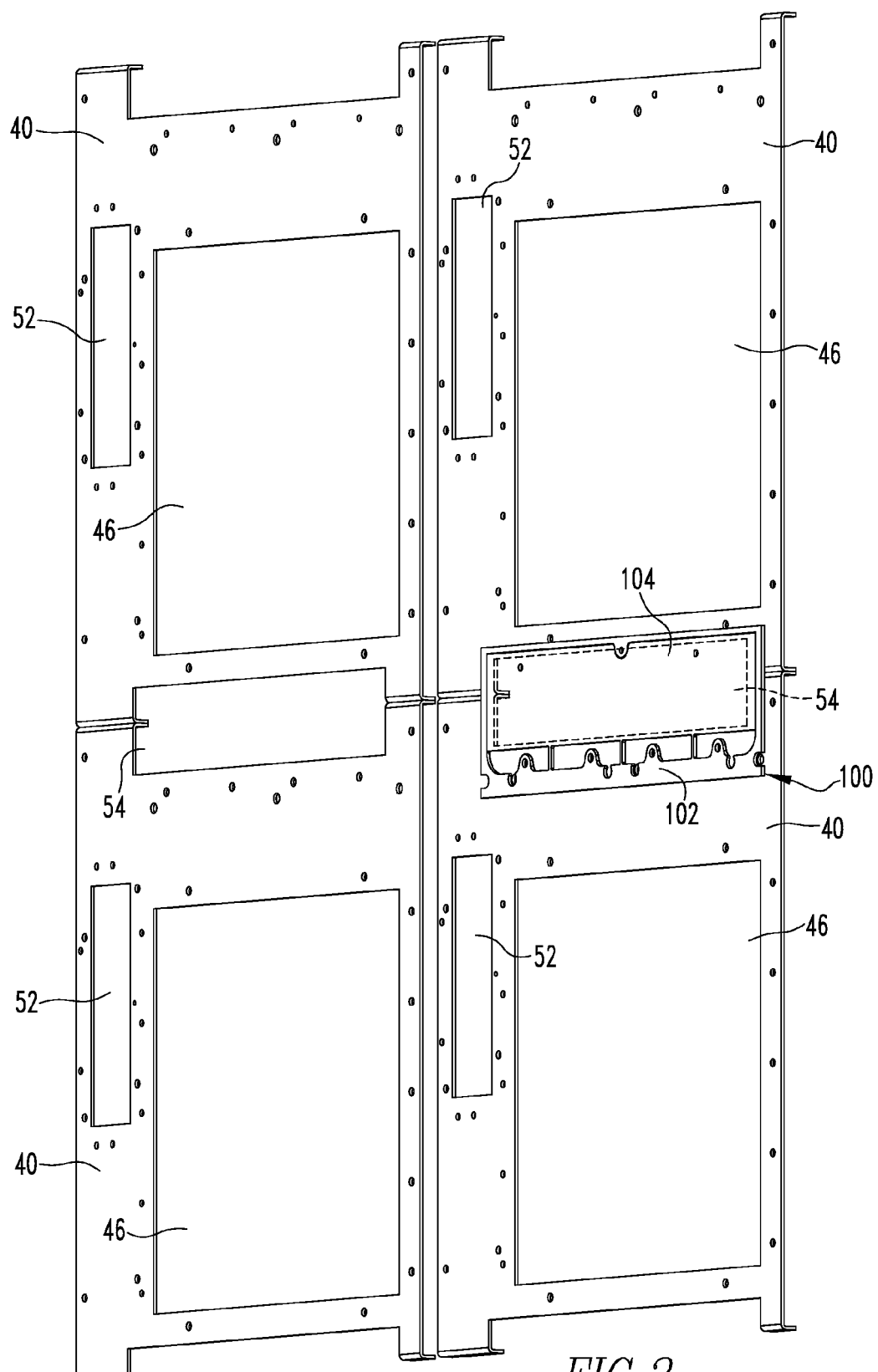
FIG. 3 is an isometric view of the bus compartment side of a portion of plural cassette assemblies including a panel assembly in accordance with an embodiment of the invention.
Figure 4:
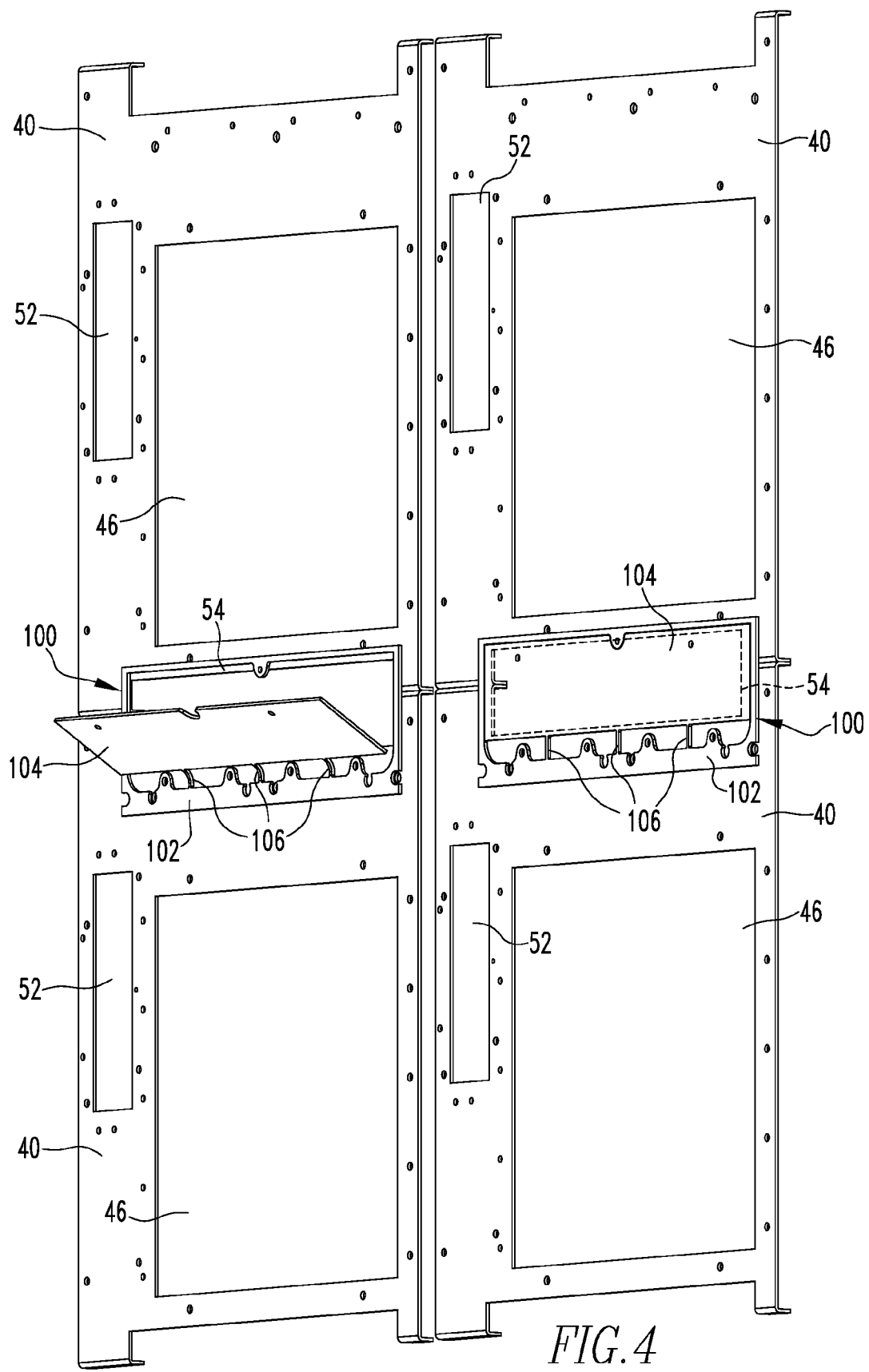
FIG. 4 is an isometric view of the portion of the plural cassette assemblies of FIG. 3 with an additional panel assembly in accordance with another embodiment of the invention.

Referring to FIG. 1, the interior 31 (FIG. 9) of each cassette 30 is defined by a top panel 32, a bottom panel 34, a left side panel 36, a right side panel 38, a rear panel 40 (FIGS. 2-4) and a door 16 of the electrical enclosure 12. Although the example enclosure 12 shown in FIG. 1 includes three cassettes 30 (two are numbered, and a top cassette is not numbered since it is behind door 16) installed therein and one additional location at the base of the enclosure 12 where an additional cassette 30 could be installed, it can be appreciated that any suitable number of cassettes 30 may be employed. As shown in FIGS. 3 and 4, rear panel 40 includes a relatively large opening 46 in which a stab support panel 44 (shown in FIGS. 1 and 2) is installed. The stab support panel 44 is formed from an insulating material and provides support to a number of stabs 48 (FIG. 1) formed from a conductive material that pass through stab support panel 44. Each of the number of stabs 48 has a first end (not numbered) extending from the support panel 44 away from the cassette 30 and a second end 50 extending from the support panel 44 into the interior of the cassette 30. Each stab 48 is electrically coupled generally at or near its first end to a corresponding one of the number of conductors 24.

Rear panel 40 of cassette 30 further includes a first aperture 52, preferably of generally rectangular shape. As best shown in FIG. 3, two adjacent rear panels 40 of the same electrical enclosure 12 may also form a second aperture 54 also of generally rectangular shape. It is to be appreciated that FIGS. 3 and 4 show a total of four rear panels 40 arranged for example and comparative purposes only and are not intended to limit the invention to a particular arrangement of panels. Such an arrangement as shown in FIGS. 3 and 4 could correspond to a total of four cassettes 30 in two side-by-side electrical enclosures 12, with each electrical enclosure 12 having two cassettes 30 stacked one above the other. It is to be further appreciated, that while second aperture 54 is shown to be formed by two separate rear panels 40, such second aperture 54 may be formed within a single rear panel 40 (similar to aperture 52). It is to be appreciated that the interior 31 (FIG. 9) of cassette 30 is substantially sealed from the bus compartment 29 (FIGS. 2 and 9) as well as preferably substantially sealed from the other cassettes 30, except at the first and second apertures 52,54.

Housed within each cassette 30 is a circuit breaker 42 having a number of primary disconnects (not shown) disposed on a rear portion (not numbered) thereof. When housed within a cassette 30, circuit breaker 42 is generally movable a distance (not shown) between a first, racked-out position (as shown by the second circuit breaker 42 from the top of FIG. 1) in which the number of primary disconnects on the rear of the circuit breaker 42 are spaced from the second ends 50 of the number of stabs 48 and a second, racked-in position (as shown by the uppermost circuit breaker 42 of FIG. 1) in which the primary disconnects on the rear portion of the circuit breaker 42 are in electrical contact with the second ends 50 of the number of stabs 48. Movement of the circuit breaker 42 between the racked-out and racked-in positions may be carried out through the use of a conventional draw out mechanism (not shown).

As shown in FIG. 2, coupled to the rear panel 40 at each of the first and second apertures 52,54 are panel assemblies 100 which may be of the same or different design dependent on location. FIGS. 5-8 show some examples of such panel assemblies that may be utilized.

Figure 5:
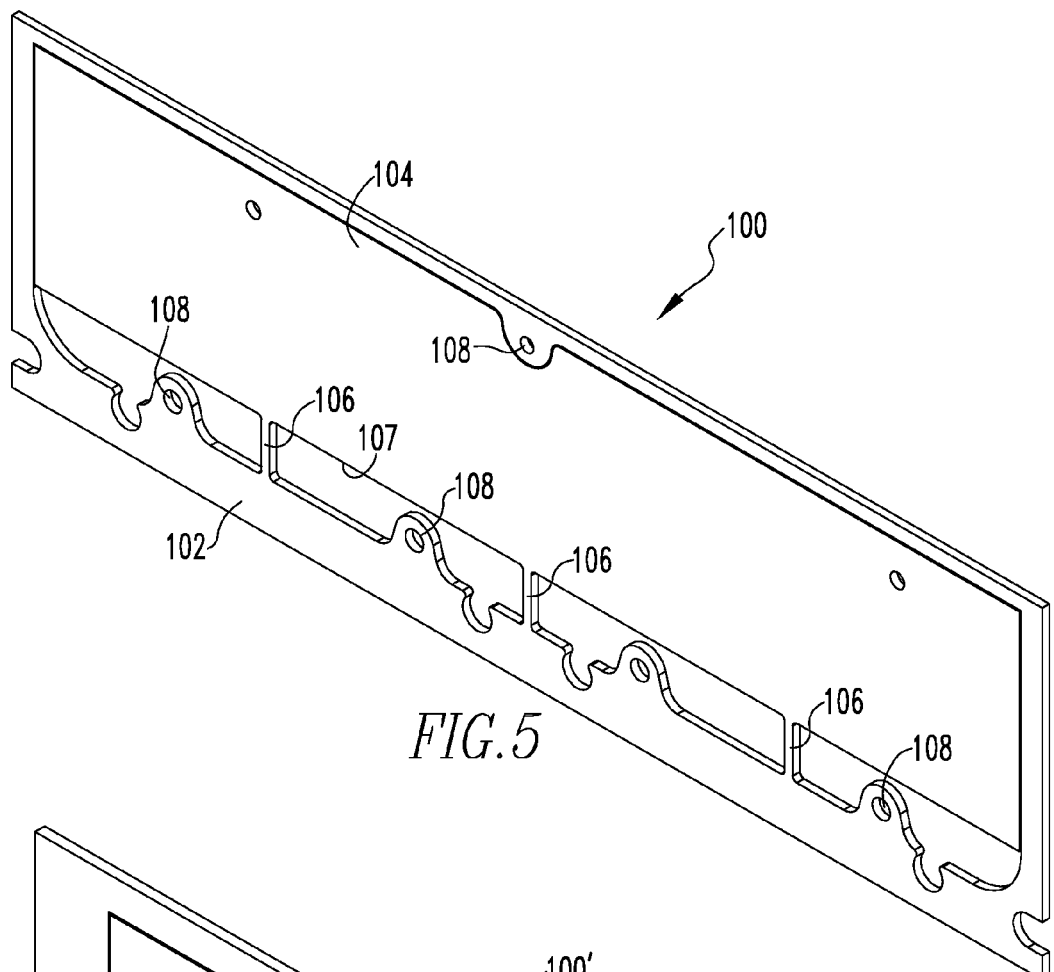

Referring to FIG. 5, panel assembly 100 (see, also, similar panel assembly 100' of FIG. 6) is preferably formed from a single, generally flat, piece of material (e.g., without limitation, a metal) and includes a mounting portion 102 coupled to a panel portion 104 via a number of tabs 106 located along a side 107 of the panel portion 104. Mounting portion 102 includes a number of mounting holes 108 that can be utilized in coupling panel assembly 100 to rear panel 40 such as shown in FIGS. 3 and 4. Panel portion 104 is preferably of dimensions slightly larger than that of the corresponding one of the first and second apertures 52,54 of FIGS. 3 and 4. As best shown in FIG. 3, when panel assembly 100 is coupled to rear panel 40, the panel portion 104 is positioned such that the underlying aperture 54 (as shown in hidden line drawing in FIG. 3) is completely or at least nearly completely covered. It is to be appreciated that when door 16 (FIG. 1) (or equivalent access panel) is secured to the cassette 30 (FIG. 1) in the closed position and panel assemblies 100 are disposed over the corresponding first and second apertures 52, 54, that the interior (not numbered) of the cassette 30 is substantially sealed from both the bus compartment 29 as well as the other cassettes 30.

As shown in FIG. 4, tabs 106 are structured to bend thus permitting the panel portion 104 of the panel assembly 100 to be displaced in a first pivotal direction from a first position (as shown on the right portion of FIG. 4) in which the panel portion 104 substantially covers the underlying aperture 54 to a second position (as shown on the left portion of FIG. 4) in which the panel portion 104 is moved generally away from the aperture 54 and mounting portion 102. Movement of the panel portion 104 in a second direction opposite the first direction is generally restricted by one or more of the edges of the underlying aperture 54 that is (are) of slightly smaller dimensions than the overlying panel portion 104. It will be appreciated that the panel assembly 100 may be similarly applied to any or all of the other apertures 52,54.

Movement of the panel portion 104 in the first pivotal direction can result from the interior of the cassette 30 (FIG. 1) becoming positively pressurized relative to the exterior of the cassette 30 (e.g., bus compartment 29). Increased pressure in the cassette 30 may result from large volumes of gas produced by an arcing event (e.g., without limitation, an electrical short) involving one or more of the stabs 48 (FIG. 1) electrically coupled to the number of conductors 24 (FIG. 1). The increase in pressure within the cassette 30 causes gases 70, as shown in phantom line drawing in FIG. 9, to be forced through one or both of the first and second apertures 52, 54. Such gases then can force the panel portions 104 of panel assemblies 100 to move from the closed position (as shown in the right portion of FIG. 4) to an open position generally toward the bus compartment 29 (as shown in the left portion of FIG. 4 and as shown in phantom line in FIG. 9). Such movement of panel portions 104 away from aperture 54 allows the volume of gases 70 generated by the arcing event within the cassette 30 to generally vent from the cassette 30 through the one or both of the first and second apertures 52,54 and into the bus compartment 29 as shown in phantom line drawing in FIG. 9. It is to be appreciated that the orientation of the panel assembly 100 (as well as the underlying aperture 52,54) may be varied as desired to help direct the venting gases in a desired direction (in the examples shown in FIGS. 4 and 9, the gases would tend to be directed upward). Additionally, the force required to move the panel portion 104 may be varied by changing the material from which the panel assembly 100 is fabricated or by varying the dimensions of the panel assembly (e.g., without limitation, the number and/or dimensions of the tabs 106; dimensions of panel portion 104). Preferably the panel assembly 100 is made from steel, however the panel assembly 100 could also be made from other suitable materials (e.g., without limitation, aluminum or plastic). It is to be appreciated that in other examples in which a cable section (not numbered) is segregated from the bus compartment 29, such a cable section may be structured in a similar manner as described herein for one of the cassettes 30 in order to provide for venting of arc gases into the bus compartment 29 from such a cable section due to an arcing event within the cable section.

In the event that the bus compartment 29 becomes positively pressurized relative to the interior 31 of one of the cassettes 30 due to large volumes of gas produced by an arcing event external to the one of the cassettes 30 (e.g., without limitation, an arcing event involving one or more of the conductors 24 in the bus compartment 29; an arcing event in a different cassette 30 of the same enclosure (if designed as such)) the inability of the panel portion 104 to move in a second direction opposite the first direction would tend to seal the interior of a cassette 30 from the pressurized external gases 72 (FIG. 9) in the bus compartment 29. In the events described herein, it is to be appreciated that the panel assembly 100 would effectively function as a one-way vent allowing the passage of high pressure gases from within the enclosure to which it is attached while also serving to block the entrance of high pressure gases from the interior of the aforementioned enclosure.

Similar to cassette 30, the interior of the electrical enclosure 12 (particularly bus compartment 29) is substantially sealed from the exterior of the electrical enclosure 12 except at a first outer aperture 60 and a second outer aperture 62 (FIG. 9). As shown in FIGS. 1, 2 and 9, coupled to the top panel(s) 26 at each of the first outer aperture 60 and second outer aperture 62 are panel assemblies 100 which, like those used on cassette 30, may be of the same or different design dependent on location. FIGS. 5-8 show some examples of such panel assemblies that may be utilized.

Referring to FIG. 9, when the bus compartment 29 becomes pressurized relative to the exterior of the electrical enclosure 12 due to an arcing event as previously described in one of the cassettes 30 or in the bus compartment 29, the increased gas pressure within the bus compartment 29 causes gases 72 to be forced through one or more of the apertures 60,62 of the electrical enclosure. Such gases 72 then can force the panel portions 104 of one or more of the panel assemblies 100 to move from a closed position (as shown for example at aperture 60 of FIG. 9) to an open position (as shown for example at aperture 62 of FIG. 9) as previously discussed in relation to the panel assemblies 100 disposed on one of the cassettes 30. Such movement of panel portions 104 away from the apertures 60,62 allow the volume of gases 72 within the bus compartment 29 to generally vent from the electrical enclosure 12. It is to be appreciated that the relative sizing and orientation of the panel assembly 100 (as well as the underlying aperture 60,62) may be varied as desired to help direct the venting gases 72 in a desired direction (e.g., without limitation, away from the front doors 16 of the enclosure 12 as shown in FIG. 9).

Figure 6:
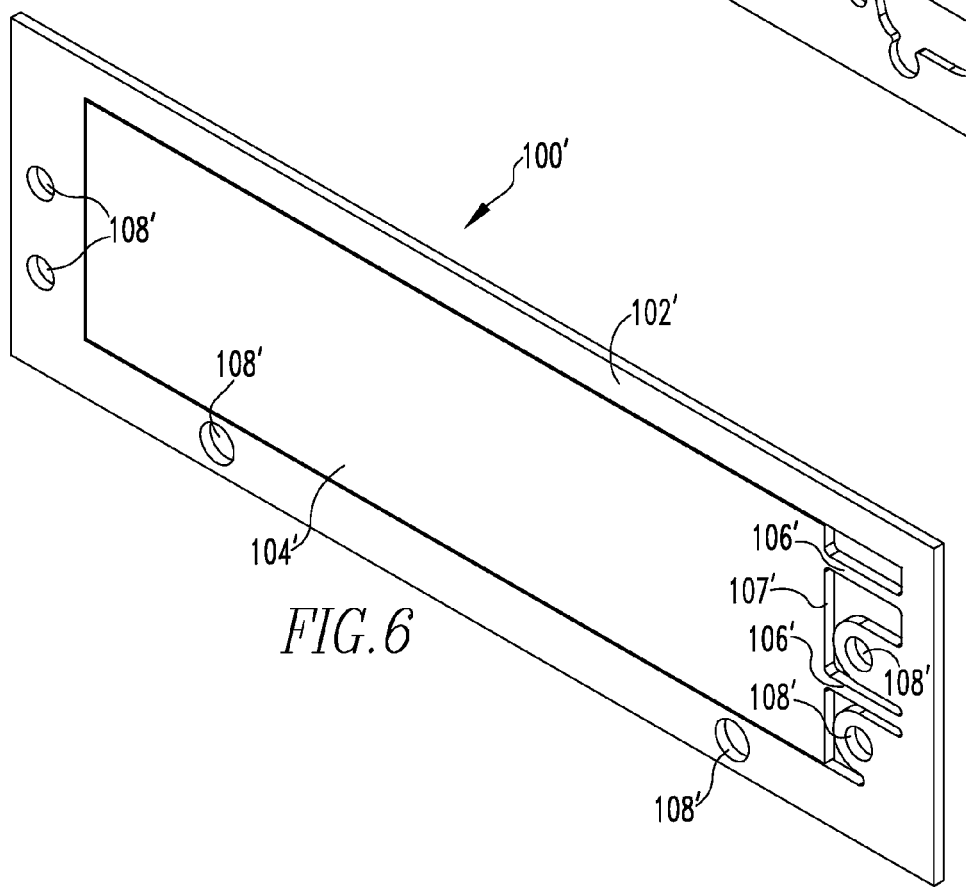

FIG. 6 shows another example of a panel assembly 100' of similar construction and function to panel assembly 100 shown in FIG. 5. Like the example of FIG. 5, the panel assembly 100' of FIG. 6 is preferably formed from a single, generally flat, piece of material (e.g., without limitation, a metal) and includes a mounting portion 102' coupled to a panel portion 104' via a number of tabs 106' located along a side 107' of the panel portion 104'. Mounting portion 102' includes a number of mounting holes 108' that can be utilized in coupling panel assembly 100' to rear panel 40 or top panel(s) 26. Panel portion 104' is preferably of dimensions slightly larger than that of the underlying aperture. As with the example of FIG. 5, the example of FIG. 6 is movable through bending of the tabs 106'.

FIGS. 7 and 8 show further examples of panel assemblies 200, 200' that may be coupled at a corresponding one of the apertures 52,54 (FIG. 3) in place of the preceding examples. Like the previous examples, the panel assemblies 200,200' of FIGS. 7 and 8 are preferably formed from a single, generally flat, piece of material and include a mounting portion 202, 202' coupled to a panel portion 204,204' via a number of tabs 206,206'. The mounting portion 202,202' includes a number of mounting holes 208,208' that can be utilized in coupling panel assembly 200,200' to rear panel 40. Unlike the previous examples, mounting tabs 206,206' coupling the panel portion 204,204' to the mounting portion 202,202' are disposed along more than one edge of the panel portion 204. The example of FIG. 7 shows mounting tabs 206 disposed along three consecutive sides 210,212,214 of panel portion 204. The example of FIG. 8 shows mounting tabs 206' disposed along two opposing sides 210', 212' of panel portion 204'. Panel assembly 200 is preferably made from an insulative material (e.g., without limitation, a thermoset fiberglass-reinforced polyester, glastic) but could also be made from other suitable materials (e.g., without limitation, plastic or urethane).

Like the previously discussed panel assemblies 100,100', when coupled to rear panel 40 (FIG. 3) at one of the apertures 52,54 (FIG. 3), the panel portion 204,204' of panel assembly 200,200' is movable, in response to a pressure increase due to an arcing event as previously described, in a first direction from a first position in which the panel portion 204,204' substantially covers the underlying aperture (52 or 54), to a second position in which the panel portion 204,204' does not cover the aperture. Unlike the previous examples of FIGS. 5 and 6, however, movement of the panel portion 204,204' does not occur via bending of the tabs 206,206' but instead occurs via fracture of at least some of the tabs 206,206' so that the panel portion 204,204' becomes partially, or completely detached from mounting portion 202,202'. Once panel portion 204,204' has become partially, or completely detached, gas within the cassette 30 (FIG. 1) may vent from the corresponding aperture (52 or 54) as previously described. Movement of the panel portion 204,204' in a direction opposite the first direction is generally restricted by one or more of the edges of the underlying aperture (52,54) that is of slightly smaller dimensions than the overlying panel portion 204, 204'.

Similar to the panel assemblies 100,100' previously discussed, the amount of pressure required to fracture the tabs 206,206' and displace the panel portion 204,204' may be varied by changing the material from which the panel assembly 200,200' is fabricated or by varying the dimensions of the panel assembly (e.g., without limitation, the number and/or dimensions of the tabs 206,206'; dimensions of panel portion 204,204').

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical enclosure assembly comprising:
    a first enclosure having a plurality of walls defining an interior and an exterior, one of said walls including a first number of one way vents, said interior being substantially sealed from said exterior except at said first number of one way vents; and
    a second enclosure within said first enclosure, said second enclosure having a plurality of walls defining an interior within the interior of said first enclosure, one of the plurality of walls of said second enclosure including a second number of one way vents, the interior of said second enclosure being substantially sealed from the interior of said first enclosure, excluding the interior of the second enclosure, except at said second number of one way vents,
    wherein a number of said first number of one way vents and said second number of one way vents comprises:
        an aperture in a corresponding wall of the walls of said first enclosure or the walls of said second enclosure,
        a mounting portion coupled to said corresponding wall,
        a panel portion extending from said mounting portion, said panel portion being movable in a first direction from a first position to a different second position relative to said mounting portion, and
        a number of elongated tabs including a pair of elongated sides, a first end coupled to said panel portion and an opposite second end coupled to said mounting portion,
    wherein said panel portion completely covers said aperture in said first position, and
    wherein said panel portion is structured to be restricted from movement in a second direction opposite said first direction by a portion of said corresponding wall.

2. The electrical enclosure assembly of claim 1, wherein said interior of said second enclosure includes a number of electrical conductors and a pressurized gas formed from an arcing event associated with said number of electrical conductors; wherein the second number of one way vents of said second enclosure are structured to vent said pressurized gas from the interior of said second enclosure into the interior of said first enclosure; and wherein the first number of one way vents of said first enclosure are structured to further vent said pressurized gas from the interior of said first enclosure to the exterior of said first enclosure.

3. The electrical enclosure assembly of claim 1, wherein said interior of said first enclosure includes a number of electrical conductors and a pressurized gas formed from an arcing event associated with said number of electrical conductors; wherein the second number of one way vents of said second enclosure are structured to seal the interior of said second enclosure from said pressurized gas; and wherein the first number of one way vents of said first enclosure are structured to vent said pressurized gas from the interior of said first enclosure to the exterior of said first enclosure.

4. The electrical enclosure assembly of claim 2, wherein the second number of one way vents of said second enclosure are further structured to direct said pressurized gas toward the first number of one way vents of said first enclosure.

5. The electrical enclosure assembly of claim 4, wherein said first enclosure includes a front access portion; and wherein the first number of one way vents of said first enclosure are further structured to direct said pressurized gas away from said front access portion.

6. The electrical enclosure assembly of claim 2, wherein said panel portion is further structured to vent said pressurized gas by moving from said first position to said different second position.

7. The electrical enclosure assembly of claim 6, wherein said mounting portion and said panel portion are formed from a single piece of material; and wherein said panel portion and said mounting portion are different portions of said single piece of material.

8. The electrical enclosure assembly of claim 7, wherein movement of the panel portion of one of said first number of one way vents from said first position to said different second position results from flexure of said number of elongated tabs.

9. The electrical enclosure assembly of claim 8, wherein the single piece of material of said first number of one way vents is made of a metal.

10. The electrical enclosure assembly of claim 1 wherein said pair of elongated sides, the first end and the second end define a width and a length of a corresponding one of said number of elongated tabs; and wherein said length is substantially greater than said width.

11. An electrical enclosure assembly comprising:
    a first enclosure having a plurality of walls defining an interior and an exterior, one of said walls including a first number of one way vents, each of said first number of one way vents comprising:
        a first aperture in said one of said walls of said first enclosure,
        a first mounting portion coupled to said one of said walls of said first enclosure,
        a first panel portion extending from said first mounting portion, said first panel portion being movable in a first direction from a first position to a different second position relative to said first mounting portion, said first panel portion being structured to be restricted from movement in a second direction opposite said first direction by a portion of said one of said walls of said first enclosure, said interior being substantially sealed from said exterior except at said first number of one way vents, and
        a number of first elongated tabs including a pair of elongated sides, a first end coupled to said first panel portion and an opposite second end coupled to said first mounting portion,
    wherein said first panel portion completely covers said first aperture in said first position; and
    a second enclosure within said first enclosure, said second enclosure having a plurality of walls defining an interior within the interior of said first enclosure, one of said walls of said second enclosure including a second number of one way vents, each of said second number of one way vents comprising:
        a second aperture in said one of said walls of said second enclosure,
        a second mounting portion coupled to said one of said walls of said second enclosure,
        a second panel portion extending from said second mounting portion, said second panel portion being movable in a third direction from a third position to a different fourth position relative to said second mounting portion, said second panel portion being structured to be restricted from movement in a fourth direction opposite said third direction by a portion of said one of said walls of said second enclosure, the interior of said second enclosure being substantially sealed from the interior of said first enclosure, excluding the interior of the second enclosure, except at said second number of one way vents, and a number of second elongated tabs including a pair of elongated sides, a first end coupled to said second panel portion and an opposite second end coupled to said second mounting portion, wherein said second panel portion completely covers said second aperture in said third position.

12. The electrical enclosure assembly of claim 11, wherein said first mounting portion and said first panel portion being formed from a single piece of first material, said first panel portion and said first mounting portion being different portions of said single piece of first material; and wherein said second mounting portion and said second panel portion being formed from a single piece of second material, said second panel portion and said second mounting portion being different portions of said single piece of second material.

13. The electrical enclosure assembly of claim 12, wherein said interior of said second enclosure includes a number of electrical conductors and a pressurized gas formed from an arcing event associated with said number of electrical conductors; wherein the second number of one way vents are structured to vent said pressurized gas from the interior of said second enclosure into the interior of said first enclosure by movement of the second panel portion of at least one of said second number of one way vents from said third position to said fourth position; and wherein the first number of one way vents are structured to further vent said pressurized gas from the interior of said first enclosure to the exterior of said first enclosure by movement of the first panel portion of at least one of said first number of one way vents from said first position to said second position.

14. The electrical enclosure assembly of claim 13, wherein said first enclosure includes a front access portion; wherein the second number of one way vents of said second enclosure are further structured to direct said pressurized gas toward the first number of one way vents of said first enclosure; and wherein the first number of one way vents of said first enclosure are further structured to direct said pressurized gas away from said front access portion.

15. The electrical enclosure assembly of claim 14, wherein movement of the first panel portion from the first position to the second position results from flexure of said number of first elongated tabs and movement of the second panel portion from the third position to the fourth position results from flexure of said number of second elongated tabs.

16. The electrical enclosure assembly of claim 12, wherein said interior of said second enclosure includes a number of electrical conductors and a pressurized gas formed from an arcing event associated with said number of electrical conductors; wherein the second number of one way vents of said second enclosure are structured to seal the interior of said second enclosure from said pressurized gas; and wherein the first number of one way vents of said first enclosure are structured to vent said pressurized gas from the interior of said first enclosure to the exterior of said first enclosure by movement of the first panel portion of at least one of said first number of one way vents from said first position to said second position.

17. The electrical enclosure assembly of claim 16, wherein movement of the first panel portion from the first position to the second position results from flexure of said number of first elongated tabs.

18. The electrical enclosure assembly of claim 11 wherein said pair of elongated sides, the first end and the second end of said number of first elongated tabs and said number of second elongated tabs define a width and a length of a corresponding one of said number of first elongated tabs and said number of second elongated tabs; and wherein said length is substantially greater than said width.

19. An electrical enclosure comprising:
a housing including a plurality of walls having a number of apertures therein, said housing defining an interior and an exterior, said exterior being substantially sealed from said interior except at said number of apertures; and
a panel assembly comprising:
a mounting portion,
a panel portion extending from said mounting portion, and
a number of elongated tabs including a pair of elongated sides, a first end coupled to said panel portion and an opposite second end coupled to said mounting portion,
wherein said mounting portion is structured to be coupled to one of the walls of said housing at or near a corresponding one of said number of apertures in order that said panel portion completely covers said corresponding one of said number of apertures,
wherein said panel portion is movable in a first direction from a first position to a different second position relative to said mounting portion, and
wherein said panel portion is structured to be restricted from movement in a second direction opposite said first direction by a portion of said housing.

20. The electrical enclosure of claim 19 wherein movement of the panel portion from said first position to said different second position results from flexure of said number of elongated tabs.

21. The electrical enclosure of claim 19 wherein said mounting portion and said panel portion are formed from a single piece of material; and wherein said panel portion and said mounting portion are different portions of said single piece of material.

22. The electrical enclosure of claim 21 wherein said single piece of material is made of a metal.

23. The electrical enclosure of claim 19 wherein said pair of elongated sides, the first end and the second end define a width and a length of a corresponding one of said number of elongated tabs; and wherein said length is substantially greater than said width.

* * * * *